United States Patent Office 3,430,044
Patented Feb. 25, 1969

3,430,044
METHOD AND APPARATUS FOR UNDERWATER RADIOLOGICAL INSPECTION, ESPECIALLY IN THE WATER-TANK OF A SWIMMING POOL REACTOR
Georges Briffaud, Versailles, France, assignor to Commissariat a l'Energie Atomique, Paris, France
Filed Apr. 25, 1966, Ser. No. 544,930
Claims priority, application France, May 6, 1965, 16,145
U.S. Cl. 250—83.3        8 Claims
Int. Cl. G01t 1/16; H01j 5/02

ABSTRACT OF THE DISCLOSURE

Radiological inspection of a prototype fuel element in a tubular container immersed in the tank of a swimming pool reactor is carried out by apparatus in an impervious casing surrounding the tubular container and moving along and around the container. A radiological transmitter and receiver are in the casing with the radiation passing through the fuel element. The pool water is excluded along the path of radiation without hindering movement of the casing.

---

This invention relates to a method for the radiological inspection in a water-filled tank, in particular the water-tank of a pool-type nuclear reactor, of an object which must as a rule remain within a permanently immersed tubular container.

The present invention also relates to an apparatus for the practical application of said method.

The inspection operation in accordance with the present invention can be carried out in accordance with any radiological method, in particular by X-rays both in radioscopy with the aid of a television camera and in radiography.

The invention is particularly suitable for the purpose of inspecting a sample placed in an irradiation loop disposed in the water-tank of a swimming-pool reactor in the vicinity of the core of this latter, and more especially for the purpose of examining the state of a prototype fuel element located within the pressure tube of a loop.

By reason of the substanttial size of irradiation loops (overall structural dimensions of the order of 16 ft. x 10 ft. x 6 ft.) and their high weight, such loops cannot be displaced except by means of their supporting trolley which is designed to run along the bottom of the water-tank and to move the loops either towards or away from the reactor core. Moreover, said irradiation loops can be lifted from their supports only to a small extent since the volume of water above the activated elements must remain sufficiently great to provide continuous and sufficient biological shielding. These conditions accordingly make it necessary, in order to perform the radiological inspection of a fuel element which is located within the pressure tube of a loop, to ensure that the viewing equipment can be immersed in the reactor tank; radiological inspection can be carried out only by means which are adapted to move along the tube or around this latter under about 25 feet of demineralized water. It follows from the foregoing that the radiological equipment must necessarily be shielded by an impervious casing.

The construction of a suitable apparatus for the inspection of a fuel element of this type sets a complex problem inasmuch as a large number of conditions have to be satisfied; in particular, it is essential to exclude the pool water which is located along the X-ray path, to ensure good mechanical behaviour of the electric cables (in particular those feeding the X-ray generator) which are subjected both to high $\gamma$-radiation by the fuel element under inspection and to repeated torsional and tensile stresses, to provide shielding within the casing so as to protect elements which are liable to be damaged by radiation (such as, for example, the wide-aperture lens of the television camera which is employed for radioscopy and its transistorized circuits), to permit of uniform movement along the pressure tube of the complete equipment whose apparent weight is in the vicinity of 15 tons, and to accommodate equipment units and devices which are both heavy, fragile and movable with respect to each other within a casing whose volume must be sufficiently small to permit of its rotation about the pressure tube without being hindered by the gas-circulation return tube.

The method and apparatus in accordance with the present invention make it possible to meet all of the requirements referred-to above.

More specifically, the present invention relates to a method for the radiological inspection within a water-filled tank of an object which is intended to remain within a tubular container which is in turn permanently immersed in said tank, wherein said method consists in providing an impervious casing which closely surrounds the tubular container and which is adapted to move slowly along said container or about this latter under the influence of a remote control system and, inside said impervious casing, on the one hand a radiological transmitter for producing radiation which passes through the object located within said tubular container and, on the other hand, a radiological receiver for collecting said radiation after its passage through said tubular container, means being interposed externally of the impervious casing between said casing and said tubular container for driving-off the pool water which is located along the path of the radiation produced by the radiological transmitter while nevertheless permitting the displacement of said impervious casing with respect to said tubular container.

The present invention also relates to an apparatus for the practical application of said method.

According to one form embodiment, the radiological transmitter is an X-ray transmitter.

The radiological receiver which is housed within the impervious casing can be of the radioscopic type with television camera for remote viewing, or of the radiographic type with photographic camera, or both types combined.

In the case in which the radiological inspection is carried out on a radioactive substance, in particular on a prototype fuel element which is located inside the pressure tube of an irradiation loop disposed within the water-tank of a pool-type reactor, the photographic camera is shielded against radiations and the television camera is also shielded against said radiations, in particular by means of a mirror system which prevents the object-lens of said camera from being located in the direct $\gamma$-radiation path.

The means which are interposed between the impervious casing and the tubular container for driving-off the pool water which is located along the path of the radiation produced by the radiological transmitter advantageously consist of inflatable pockets.

The features of the present invention will be disclosed hereinafter, reference being had to the accompanying drawings in which.

Figure 1:
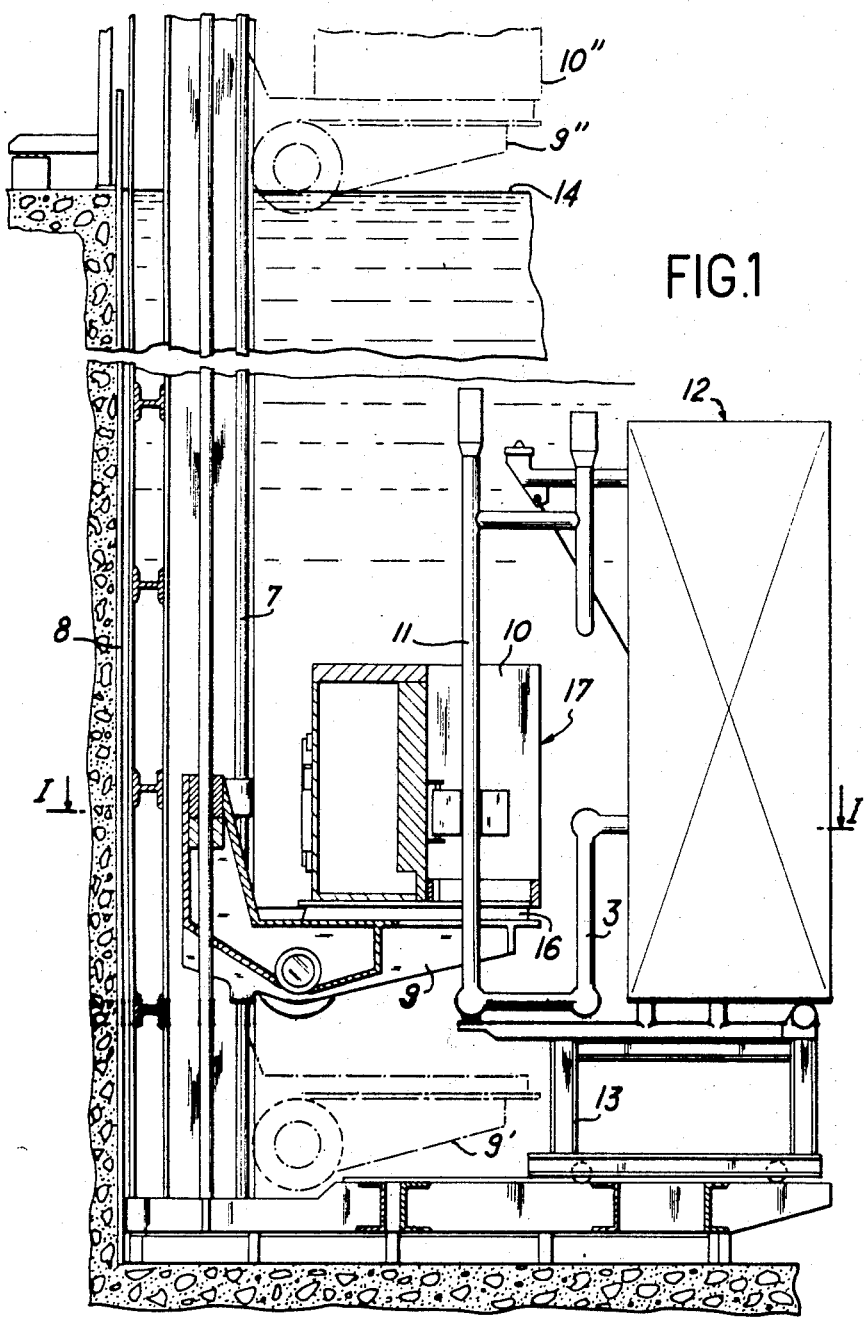
FIG. 1 is an elevational view of an apparatus in accordance with the invention which is located in the water-tank of a pool-type nuclear reactor.
Figure 2:
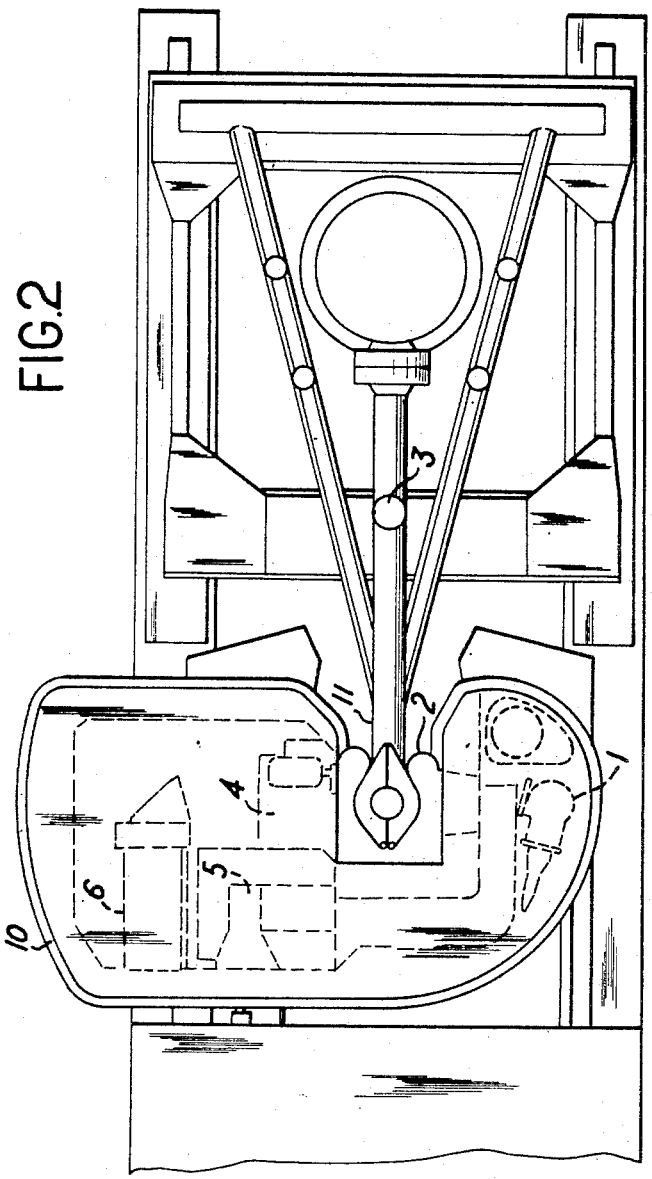
FIG. 2 is an overhead sectional view of said apparatus taken along line I—I of FIG. 1.

The apparatus in accordance with the invention is generally made up as shown in FIGS. 1 and 2, and accordingly consists of two columns 7 for supporting and guiding a movable bracket 9 on which is carried an impervious casing 10. Said columns are secured vertically against the walls 8 of the water-tank of a swimming-pool reactor. The above-mentioned bracket 9 is capable of moving upwards and downwards along said columns, the lower limit of travel of said bracket being shown at 9′ whilst the upper limit of travel is shown at 9″ above the level 14 of the pool water. The movements of the bracket are remote-controlled from a viewing room (not shown) in which are located a control desk and a television screen (for radioscopic observations). Power is supplied through underwater cables (not shown) which are laid in such a manner as not to obstruct the impervious casing either in the displacements of this latter along the pressure tube 11 which contains the fuel element to be inspected or during the movement of rotation thereof about said pressure tube.

The reference numerals 12, 13 and 3 designate respectively the loop, loop support pillar and the gas-circulation return tube. The impervious casing 10 is made up of a mounting-plate 16 on which are carried the different radiological inspection devices, and a bell-housing 17 which surrounds the complete assembly and ensures leak-tightness with said mounting-plate.

Figure 3:
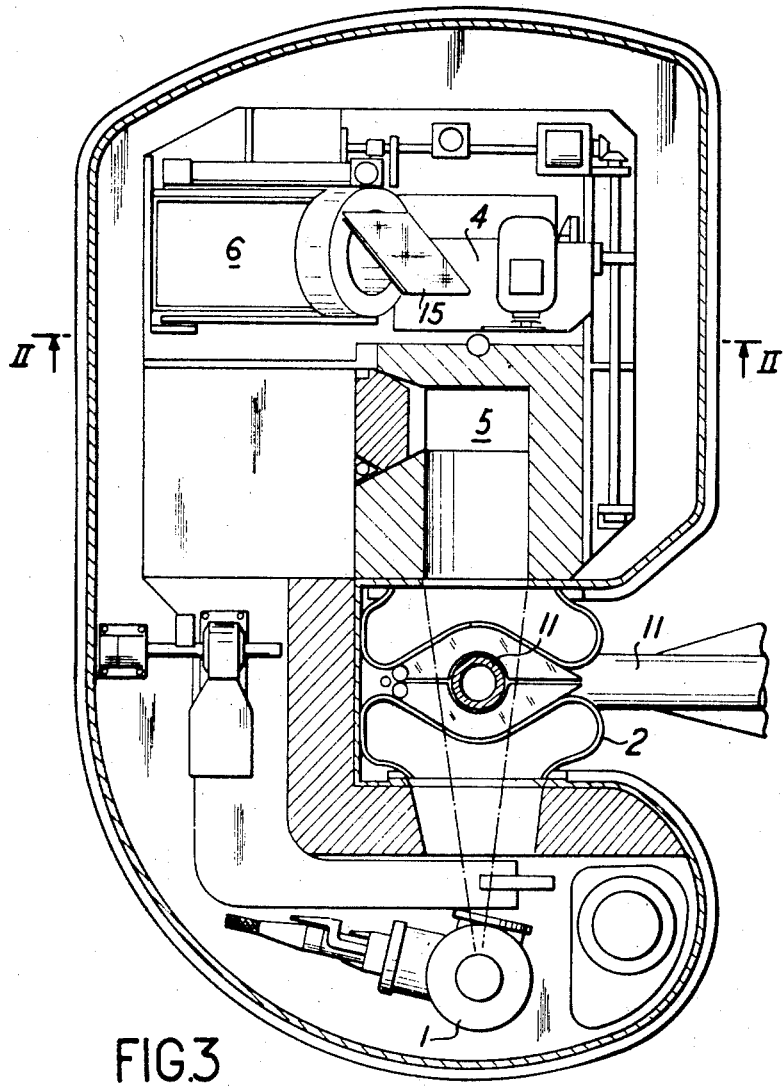
FIGS. 3 and 5 are sectional views of the impervious casing alone, taken along the same plane as FIG. 2 and on a larger scale, respectively in the case of utilization of the apparatus for remote radiography and radioscopy (in conjunction with a television camera)
Figure 4:
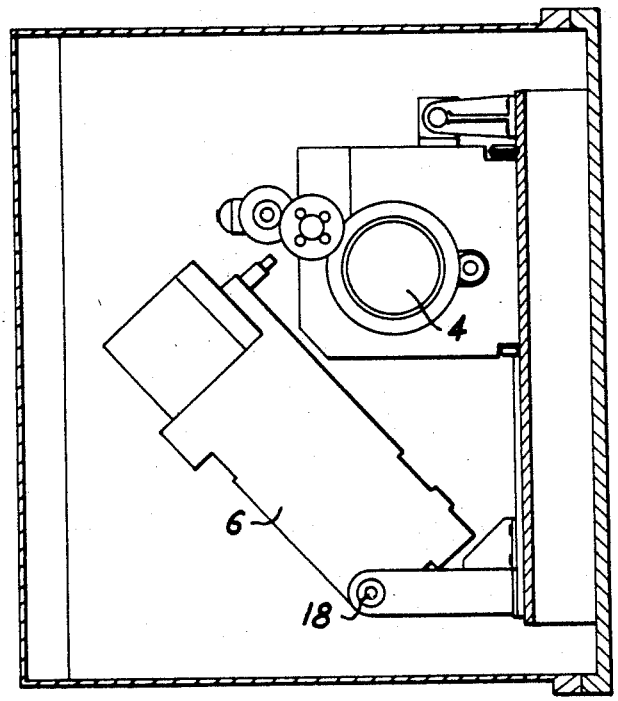
FIG. 4 is a sectional view taken along line II—II of FIG. 3.
Figure 5:
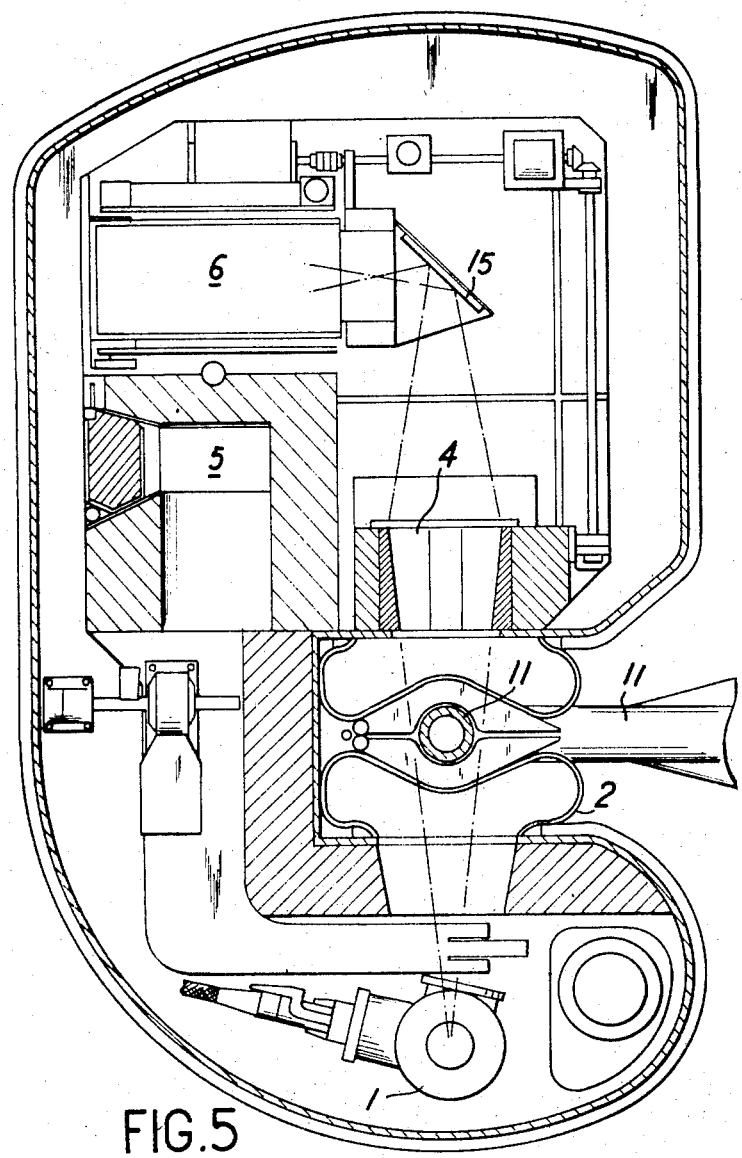

The radiological inspection devices referred-to are specifically illustrated in FIGS. 3 to 5 and consist of:

(a) An X-ray transmitter 1 (300 kv.–4 ma.) which is adapted to move on each side of a central position setting, thereby permitting of compensation in the event that the dimensions of the X-ray field are slightly too small;

(b) Inflatable pockets 2 which serve to displace the sheet of water which is located along the path of the X-rays produced by the X-ray transmitter 1 without thereby hindering the movements of the casing 10 relative to the pressure tube 11 (either along or about this latter);

(c) For the purpose of carrying out radiographic inspections of the fuel element which is located within the pressure tube, a shielded film-unwinding camera 5 with an adjustable collimating slit;

(d) For the purpose of carrying out radioscopic inspections of the same fuel element, a rotatable grid 4 having slits which are focussed in three dimensions on the X-ray generator focus, and a television camera 6 comprising a mirror system 15 for shielding against $\gamma$-radiation which would otherwise have a detrimental effect in spite of the attenuation which is afforded by the grid 4, if such radiation were to impinge directly on the lens. Focussing of the camera is controlled from the viewing room.

When the apparatus in accordance with the invention is no longer required for radioscopy as shown in FIG. 5 and it is desired to change over to radiography as shown in FIG. 3, it is merely necessary to tilt the television camera 6 about the horizontal pivot-pin 18 as shown in FIG. 4, to move back the rotatable grid 4 so that this latter takes up the space which has thus been freed, and to move forward the film-unwinding camera 5 into the operating position along the X-ray axis.

The films employed are of the usual type employed in industrial radiography. Re-loading of spools is carried out when the casing 10 is located above the pool-water level (position 10″ in FIG. 1).

The casing 10 is capable of moving vertically in a continuous manner over a distance of about three feet for the purpose of continuous-motion radiography and over a distance of about eight feet for intermittent-motion radiography. The casing is also capable of rotating through an angle of approximately 200° about the pressure tube 11 over the vertical distance which corresponds to the length of the fuel element.

Radiographic recording is performed on the continuous-motion principle; the impervious casing 10 is endowed with a vertical movement which is very slow by reason of the fact that the pressure tube 11 has a very high opacity which may result in X-ray attenuation by a factor of 23 at a power rating of 300 kv.; the film is wound-off in the direction opposite to the casing at a speed such that the geometric proportions of the fuel element under inspection are retained on the image. The shielded film-unwinding camera 5 is of a type similar to those employed for aerial photography.

As is readily apparent, the devices employed for the purpose of driving the impervious casing can be different from those which have been described in the foregoing and it must further be understood that the apparatus in accordance with the invention can be employed in tanks other than the water-tanks of swimming-pool reactors.

The embodiments of the invention in which an exclusive property or privilege is claimed are defined as follows:

1. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely controlled devices for producing the slow movement of said casing, a radiological transmitter housed within said impervious casing so that the radiation produced by said transmitter passes through the object which is enclosed within said tubular container, a radiological receiver housed in that portion of said impervious casing which is located diametrically opposite to said radiological transmitter with respect to said tubular container and adapted to receive said radiation after its passage through said tubular container and, externally of said impervious casing between said casing and the tubular container, means for driving-off the pool water which is located along the path of the radiation produced by the radiological transmitter while nevertheless permitting the displacement of said impervious casing with respect to said tubular container.

2. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely controlled devices for producing the slow movement of said casing, an X-ray transmitter housed within said impervious casing so that the radiation produced by said transmitter passes through the object which is enclosed within said tubular container, a radiological receiver housed in that portion of said impervious casing which is located diametrically opposite to said X-ray transmitter with respect to said tubular container and adapted to receive said radiation after its passage through said tubular container and, externally of said impervious casing between said casing and the tubular container, means for driving-off the pool water which is located along the path of the radiation produced by the X-ray transmitter while nevertheless permitting the displacement of said impervious casing with respect to said tubular container.

3. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely controlled devices for producing the slow movement of said casing, a radiological transmitter housed within said impervious casing so that the radiation produced by said transmitter passes through the object which is enclosed within said tubular container, a radioscopic receiver housed in that portion of said impervious casing which is located diametrically opposite to said radiological transmitter with respect to said tubular container and adapted to receive said radiation after its passage through said tubular container, a television camera for the remote viewing of the image received by said radioscopic receiver and, externally of said impervious casing between said casing and the tubular container, means for driving-off the pool water which is located along the path of the radiation produced by the radiological transmitter while nevertheless permitting the displacement of said impervious casing with respect to said tubular container.

4. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely controlled devices for producing the slow movement of said casing, a radiological transmitter housed within said impervious casing so that the radiation produced by said transmitter passes through the object which is enclosed within said tubular container, a radiographic receiver housed in that portion of said impervious casing which is located diametrically opposite to said radiological transmitter with respect to said tubular container and adapted to receive said radiation after its passage through said tubular container and, externally of said impervious casing between said casing and the tubular container, means for driving-off the pool water which is located along the path of the radiation produced by said radiological transmitter while nevertheless permitting the displacement of said impervious casing with respect to said tubular container.

5. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely-controlled devices for producing the slow movement of said casing, a radiological transmitter housed within said impervious casing so that the radiation produced by said transmitter passes through the object which is enclosed within said tubular container, a radiographic receiver housed in that portion of said impervious casing which is located diametrically opposite to said radiological transmitter with respect to said tubular container and adapted to receive said radiation after its passage through said tubular container and, externally of said impervious casing between said casing and the tubular container, a shield adapted to protect the camera of said radiographic receiver against $\gamma$ radiation and means for driving-off the pool water which is located along the path of the radiation produced by the radiological transmitter while nevertheless permitting the displacement of said impervious casing with respect to said tubular container.

6. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely-controlled devices for producing the slow movement of said casing, a radiological transmitter housed within said impervious casing so that the radiation produced by said transmitter passes through the object which is enclosed within said tubular container, a radioscopic receiver housed in that portion of said impervious casing which is located diametrically opposite to said radiological transmtter with respect to said tubular container and adapted to receive said radiation after its passage through said tubular container, a television camera for the remote viewing of the image received by said radioscopic receiver, a mirror system adapted to protect said television camera against direct $\gamma$ radiation and, externally of said impervious casing between said casing and the tubular container, means for driving-off the pool water which is located along the path of the radiation produced by the radiological transmitter while nevertheless permitting the displacement of said impervious casing with respect to said tubular container.

7. Apparatus for the radiological inspection within a water-filled tank, in particular the water-tank of a swimming-pool reactor, of an object such as a prototype fuel element which is intended to remain inside a tubular container which is in turn permanently immersed in said tank, wherein said apparatus comprises an impervious casing which closely embraces said tubular container and is adapted to move slowly along and around said container, remotely-controlled devices for producing the slow movement of said casing, a radiological transmitter housed within said impervious casing so that the radiation produced by said transmitter passes through the object which is enclosed within said tubular container, a radiological receiver housed in that portion of said impervious casing which is located diametrically opposite to said radiological transmitter with respect to said tubular container and adapted to receive said radiation after its passage through said tubular container and, externally of said impervious casing between said casing and the tubular container, inflatable pockets for driving-off the pool water which is located along the path of the radiation produced by the radiological transmitter while nevertheless permitting the displacement of said impervious casing with respect to said tubular container.

8. In a method for radiological inspection within a water-filled tank of a swimming pool reactor of an object inside a tubular container permanently immersed in the tank, the steps of moving a water impervious casing adjacent to and surrounding the container, moving the casing slowly along and around the container, producing radiation in the casing, passing the radiation through the object in the container, receiving in the casing the radiation passed through the object and driving off the water along the path of radiation during movement of the casing with respect to the container.

References Cited

UNITED STATES PATENTS 2,478,842  8/1949  Schwartz et al. _____ 250—88
3,066,254  11/1962  Price et al.
3,178,576  4/1965  Arvanetakis.

ARCHIE R. BORCHELT, *Primary Examiner.*

U.S. Cl. X.R.

250—88